(12) United States Patent
Deas

(10) Patent No.: US 7,366,203 B2
(45) Date of Patent: Apr. 29, 2008

(54) PASSIVE OPTICAL NETWORK AND ULTRAWIDE BAND ADAPTER

(75) Inventor: David A. Deas, Round Rock, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 710 days.

(21) Appl. No.: 10/810,488

(22) Filed: Mar. 26, 2004

(65) Prior Publication Data

US 2005/0213974 A1    Sep. 29, 2005

(51) Int. Cl.
H04H 1/04    (2006.01)

(52) U.S. Cl. .................. 370/487; 370/465; 375/130; 398/140

(58) Field of Classification Search .................. None
See application file for complete search history.

(56) References Cited

U.S. PATENT DOCUMENTS

| | | | |
|---|---|---|---|
| 5,610,907 A | 3/1997 | Barrett | |
| 5,761,351 A | 6/1998 | Johnson | |
| 5,773,817 A | 6/1998 | Kingsley et al. | |
| 5,812,081 A * | 9/1998 | Fullerton | 342/21 |
| 6,160,802 A | 12/2000 | Barrett | |
| 6,492,904 B2 | 12/2002 | Richards | |
| 6,505,032 B1 | 1/2003 | McCorkle et al. | |
| 6,535,331 B2 | 3/2003 | Shiota et al. | |
| 6,549,587 B1 | 4/2003 | Li | |
| 6,643,417 B2 | 11/2003 | Strutz et al. | |
| 6,721,797 B1 | 4/2004 | Kim | |
| 6,735,238 B1 | 5/2004 | McCorkle | |
| 6,757,251 B1 | 6/2004 | Nakaishi | |
| 6,782,048 B2 * | 8/2004 | Santhoff | 375/240 |
| 2003/0138061 A1 | 7/2003 | Li | |
| 2003/0235236 A1 | 12/2003 | Santhoff | |
| 2004/0081402 A1 | 4/2004 | Ouchi | |
| 2004/0143428 A1 | 7/2004 | Rappaport et al. | |
| 2004/0187156 A1 * | 9/2004 | Palm et al. | 725/81 |
| 2004/0264974 A1 | 12/2004 | Sorenson | |

* cited by examiner

*Primary Examiner*—Wing Chan
*Assistant Examiner*—Michael J. Moore
(74) *Attorney, Agent, or Firm*—Toler Law Group, Intellectual Properties

(57) ABSTRACT

The disclosure relates generally to a system including a passive optical network element and a first ultra wideband adapter coupled to the passive optical network element. The first ultra wideband adapter is coupled via a data communication line to a second ultra wideband adapter. The second ultra wideband adapter has a connection to an end user computing device.

14 Claims, 2 Drawing Sheets

PASSIVE OPTICAL NETWORK AND ULTRAWIDE BAND ADAPTER

BACKGROUND

1. Field of the Disclosure

The present disclosure relates generally to a system having a passive optical network and ultra wideband adapters.

2. Description of the Related Art

Research efforts in ultrawide band (UWB) apparatus were initiated in military research laboratories in the United States and Europe in the 1950s-1960s. The military's primary interest was development of UWB technology as a means of "seeing" through trees and other obstructions that would not be possible utilizing conventional radar systems.

Ultrawide band uses very short duration pulses, in the billionths or trillionths of a second duration, which provides excellent range resolution at a lesser cost than conventional radars. Each pulse covers several gigahertz of radio spectrum, with information being transmitted by modulating the timing, amplitude, polarity, or other aspect of the pulses. The location of an object, to within centimeters, is inferred utilizing methods employed in conventional radars, e.g., echo return timing, target triangulation, and the like. This precise location technology has been demonstrated in automotive collision warning systems, through-wall sensing applications, soil-characterization, and industrial level measurement, amongst others.

Until recently, UWB was constrained by regulatory restrictions in the United States and abroad. However, with the relaxation of these regulations, and the inclusion of UWB into communication standards, interest from the private sector has expanded to transfer this technology into commercial production. One particular area where UWB commercialization may be viable is in the field of high-speed communications. While conventional UWB methods and systems may be suitable for military uses, such implementations do not yet meet the needs of commercial communications applications, including robust customer delivery, scalability, ease of maintenance, flexibility, and overall system and service operation.

Accordingly, there is a need for improved ultrawide band methods, systems, and devices that may be deployed in commercial applications.

DETAILED DESCRIPTION OF THE DRAWINGS

In a particular embodiment, the present disclosure is directed to a system including a passive optical network element and a first ultra wideband adapter coupled to the passive optical network element. The first ultra wideband adapter is coupled via a data communication line to a second ultra wideband adapter. The second ultra wideband adapter has a connection to an end user computing device.

In another particular embodiment, the system includes a passive optical network element having an input to receive an optical communication signal and having a video output, a data output, and a telephony output. The system includes a first ultra wideband adapter coupled to the passive optical network element. The first ultra wideband adapter has a first input coupled to the video output and a second input coupled to the data output. The first ultra wideband adapter has an ultra wideband data output coupled via a data communication line to a passive cable splitter element. The passive cable splitter element is connected to a first coaxial cable path and a second coaxial cable path. The system also includes a second ultra wideband adapter having an input coupled to the second coaxial cable path and having an output data connection configured to interface with a personal computer. In another embodiment, an ultra wideband adapter is disclosed that includes a first input coupled to a far end ultra wideband adapter via an intermediary coaxial cable communication line. The far end ultra wideband adapter is coupled to a passive optical network data source and a data output configured for connection to a data interface of a computer device.

Figure 1:
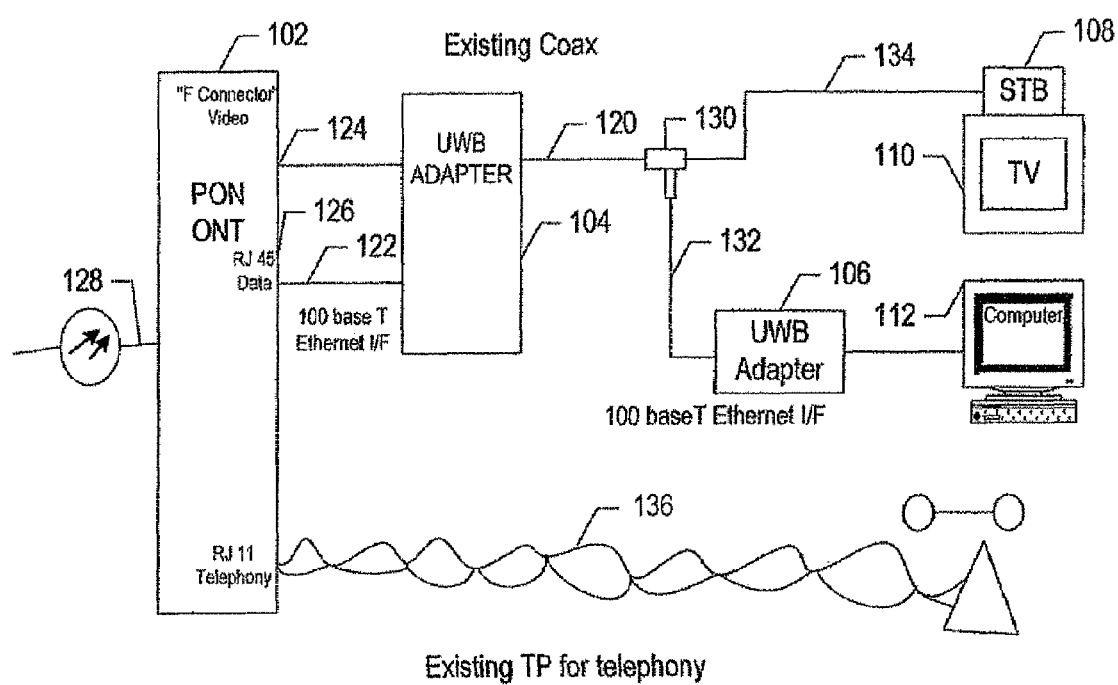
FIG. 1 is a block diagram of a system including ultra wideband adapters and a passive optical network (PON).

Referring to FIG. 1, a system for communicating data is disclosed. The system includes a passive optical network element 102, a first ultra wideband adapter 104, and a second ultra wideband (UWB) adapter 106. The system also includes existing coaxial cable 120 connected to the UWB adapter 104. The existing coaxial cable 120 is a communication medium for carrying video and data and is connected to a passive cable splitter 130. The passive cable splitter 130 connects to a first cable path 132 for connection to the UWB adapter 106 and to a second cable path 134 for connection to a far end set top box 108. The illustrated set top box 108 is coupled to a display device 110 such as a monitor or television. The second cable path 134 typically carries a video signal for display on the end user display 110. The second UWB adapter 106 includes a data connection interface that is coupled to an end user computer 112.

The first UWB adapter 104 includes a first input to receive a video signal from the passive optical network element 102 at interface 124. The first UWB adapter 104 also includes a second input to receive data produced by a data port 126 of the passive optic network element 102. The data path may be provided using an Ethernet type interface such as a 100 base T Ethernet connection 122. The passive optical network element 102 also includes an output for telephony signals. The telephony output may be an RJ 11 connection and may be connected over an existing twisted pair telephone line 136 to an end user telephone device. The passive optical network element 102 in a particular embodiment is an optical network terminal as shown in FIG. 1. The passive optical network (PON) element 102 is coupled to an optical communication signal 128 as shown.

During operation, optical communication signals 128 are received by the PON element 102. The PON element 102 provides a video signal at video output 124 and provides a data signal at data output 126. The video output and the data output are both connected to the first UWB adapter 104. The UWB adapter passes a video signal over the coaxial cable 120 and also provides an ultra wideband signal to carry data received from the PON 102. The data signal, after being converted to an ultra wideband signal, may be carried on the same coaxial cable 120 as the video signal without interference. The video and data signals are carried along coaxial cable 120 to the passive cable splitter 130. The data and video signals are carried to the second UWB adapter 106 where the data signal is filtered and detected from ultra wideband signal and converted to a baseband Ethernet data stream that is suitable for communication to the computer 112. The video and data signals are provided over the cable path 134 to set top box 108 where the video is displayed on a monitor or television as shown and the UWB data stream is seen as low level interface to the set top box 108. Thus, a personal computer user within a residence may have access to high-speed data carried along an existing coaxial cable supporting a multi-channel video signal. The high-speed data may be provided over the same communication media as a video signal, which may be used by the end user for television display.

Data originating from a computer such as the illustrated personal computer 112 may be provided over a data interface to the ultra wideband adapter 106. The ultra wideband adapter 106 produces an ultra wideband signal, which is carried along cable path 132 and coaxial cable 120. The data is communicated via the ultra wideband signal to the first ultra wideband adapter 104 at a far end. The far end UWB adapter 104 converts the ultra wideband signal to the source data originally provided by computer 112. The data as converted at the UWB adapter 104 is provided over the Ethernet connection 122 to the data port 126 of the passive optical network element 102. Once at the passive optic network element 102, the received data may be further encoded and transmitted over the PON optical network via optical communication signals such as optical signal 128, as shown.

Thus, the UWB adapter 104, placed between the PON terminal 102, which is connected to data port 126 and to the existing coaxial cable which may be carried to a residence, injects data packets onto the coaxial cable that may be extracted at the personal communicator 112 thru another UWB adapter, such as UWB adapter 106 as illustrated. Since data is injected via a UWB adapter, the resulting signal appears on the coaxial cable as an increased noise floor that is low enough to not interfere with video at the set top box 108 but is recoverable at UWB adapter 106.

UWB technology is low power and power may be provided to the UWB adapter 106 over the coaxial cable from the PON terminal 102. In a particular embodiment, the UWB adapter may be implemented as a UWB base band transceiver and is coupled to coaxial media.

While current UWB implementations are limited by certain FCC rules with regard to utilization of RF spectrum, since the disclosed method injects UWB signals onto a guided media, such as a coaxial cable, UWB FCC admission rules do not apply, thereby allowing a designer to use the full range of RF spectrum over coaxial cable to achieve large bandwidths, such as those above 100 megabits per second.

In addition, due to the large bandwidth provided by UWB technology, significant broadband data may be delivered over existing coaxial cable. Such implementation avoids the expense of requiring additional cabling such as placing category five (CAT 5) type cabling inside existing homes, apartments, or businesses. Installation and the inconvenience of installing new cabling to provide broadband data is thereby eliminated. In addition, with the disclosed implementation, the system supplies a 100 base T Ethernet data connection throughout an existing home or business and provides an application that moves PON technology closer to a customer installable system.

Figure 2:
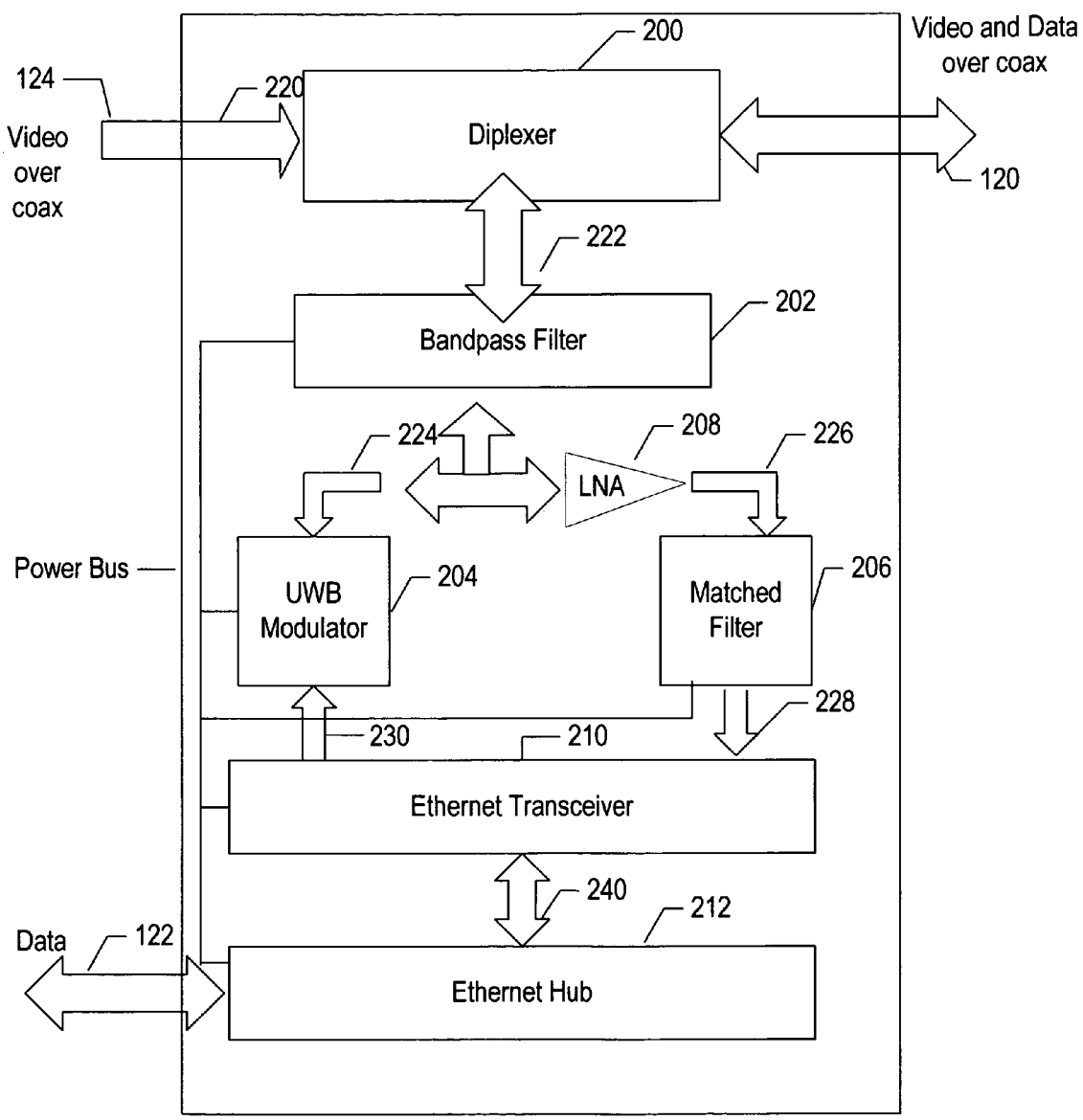
FIG. 2 is a block diagram of an illustrative ultra wideband adapter.

Referring to FIG. 2, a particular illustrative embodiment of a UWB adapter 104 is shown. The UWB adapter 104 has a video over coax input 124 and a video and data over coax output 120. The UWB adapter 104 also includes a data interface 122. The UWB adapter 104 as shown includes a diplexer 200, a bandpass filter 202, a UWB modulator 204, a matched filter 206, and an Ethernet transceiver 210. The UWB adapter 104 also includes an Ethernet hub 212 coupled to the Ethernet transceiver 210 via intermediate communication bus 240. The Ethernet hub 212 is coupled to the data interface 122 and serves the purpose of providing a passive Ethernet connection for test access if required. The Ethernet transceiver 210 has an output 230 to the UWB modulator 204 and has an input 228 responsive to match filter 206. The bandpass filter 202 is coupled to the diplexer 200 via communication bus 222. Bandpass filter 202 is coupled to the UWB modulator 204 via path 224 and is coupled to the matched filter 206 via path 226 and low noise amplifier 208. The low noise amplifier 208 receives a filtered signal from the bandpass filter 202 and provides an amplified version of the bandpass filtered signal 226 to the matched filter 206.

During operation, a video signal 124 is received at input 220 to diplexer 200. The video signal is passed to bandpass filter 202 and is amplified by the low noise amplifier (LNA) 208 and provided to the matched filter 206. A resulting match filter output 228 is provided to Ethernet transceiver 210. The Ethernet transceiver 210 provides an output 230 to UWB modulator 204. The UWB modulator 204 is also coupled to Ethernet hub 212 and bandpass filter 202. A resulting output signal in data form is provided at video and data output 120. A data output signal is also provided at the data output 122 coupled to the Ethernet hub 212.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a passive optical network element;
   a first ultra wideband adapter coupled to the passive optical network element, the first ultra wideband adapter including a first output coupled to a first communication line;
   a passive communication line splitter including a first input coupled to the first output via the first communication line, a second output coupled to a second communication line, the passive communication line splitter having a third output to a television receiving device via a third communication line; and
   a second ultra wideband adapter including a second input coupled to the passive communication line splitter via the second communication line, the second ultra wideband adapter having a connection to an end user computer device.

2. The system of claim 1, wherein the third output is connected to a set top box via the third communication line.

3. The system of claim 2, wherein the set top box is coupled to a television monitor device.

4. The system of claim 1, wherein the first ultra wideband adapter includes a third input coupled to a video output of the passive optical network element and includes a fourth input coupled to an Ethernet data output of the passive optical network element.

5. The system of claim 4, wherein the passive optical network element further includes a telephone output connected via a telephone line to an end user telephone device.

6. The system of claim 5, wherein the end user telephone device and the end user computer device are located within a common residential unit.

7. The system of claim 1, wherein the passive optical network element has an input to receive an optical communication signal.

8. A system comprising:
- a passive optical network element having an input to receive an optical communication signal and having a video output, a data output, and a telephony output;
- a first ultra wideband adapter coupled to the passive optical network element, the first ultra wideband adapter having a first input coupled to the video output and a second input coupled to the data output, the first ultra wideband adapter having an ultra wideband data output coupled via a data communication line to a passive cable splitter element, the passive cable splitter element connected to a first coaxial cable path and a second coaxial cable path;
- a second ultra wideband adapter having an input coupled to the second coaxial cable path and having an output data connection configured to interface with a personal computer.

9. The system of claim 8, wherein the first coaxial cable path is coupled via a set top box to a video monitor device.

10. The system of claim 8, wherein the video output is an F connector.

11. The system of claim 8, wherein the data output is a 100 base T Ethernet interface.

12. A method of processing communication data comprising:
- receiving a video signal from a passive optical network element;
- receiving a data signal from the passive optical network element;
- converting the data signal to an ultra wideband signal;
- communicating the video signal and the ultra wideband signal along a coaxial cable to a passive cable splitter element;
- splitting the video signal and the ultra wideband signal at the passive cable splitter element into a first split signal and a second split signal, wherein the first split signal and the second split signal both include the video signal and the ultra wideband signal;
- providing the first split signal to a video receiving device;
- providing the second split signal to an ultra wideband adapter;
- detecting the ultra wideband signal in the second split signal at the ultra wideband adapter; and
- converting the ultra wideband signal at the ultra wideband adapter into a computer readable data signal.

13. The method of claim 12, further comprising providing the computer readable data signal to an input of a computer device.

14. The method of claim 12, wherein the ultra wideband signal is position or amplitude modulated across a range of spectra extending anywhere from 1 GHz to 10 GHz.

* * * * *